US008825744B2

(12) United States Patent
Wang et al.

(10) Patent No.: US 8,825,744 B2
(45) Date of Patent: Sep. 2, 2014

(54) ACTIVE IMAGE TAGGING

(75) Inventors: Meng Wang, Beijing (CN); Xian-Sheng Hua, Beijing (CN); Kuiyuan Yang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 263 days.

(21) Appl. No.: 12/813,328

(22) Filed: Jun. 10, 2010

(65) Prior Publication Data

US 2011/0307542 A1 Dec. 15, 2011

(51) Int. Cl.
*G06F 15/16* (2006.01)

(52) U.S. Cl.
USPC ............ 709/203; 709/242; 715/205; 715/792

(58) Field of Classification Search
USPC ........................................................ 709/203
See application file for complete search history.

(56) References Cited

U.S. PATENT DOCUMENTS

| | | | |
|---|---|---|---|
| 7,686,682 B2 | 3/2010 | Diakopoulos et al. | |
| 7,703,040 B2 * | 4/2010 | Cutrell et al. | 715/792 |
| 8,103,646 B2 * | 1/2012 | Brown | 707/705 |
| 2001/0037337 A1 * | 11/2001 | Maier et al. | 707/101 |
| 2002/0116525 A1 * | 8/2002 | Peters et al. | 709/242 |
| 2007/0271498 A1 * | 11/2007 | Schachter | 715/501.1 |
| 2008/0183757 A1 * | 7/2008 | Dorogusker et al. | 707/104.1 |
| 2008/0228749 A1 * | 9/2008 | Brown | 707/5 |
| 2009/0192998 A1 * | 7/2009 | Paulsen | 707/3 |
| 2009/0313294 A1 | 12/2009 | Mei et al. | |
| 2010/0124991 A1 * | 5/2010 | O'Sullivan et al. | 463/42 |

OTHER PUBLICATIONS

"AltaVista Company—Altavista Search Home", retrieved on Apr. 16, 2010 at <<http://www.altavista.com/>>, Overture Services Inc., 2007 pp. 1.
Ayache, Gensel, Quenot, "CLIPS-LSR Experiments at TRECVID 2006", retrieved on Apr. 16, 2010 at http://citeseerx.ist.psu.edu/viewdoc/download?doi=10.1.1.142.3838&rep=rep1&type=pdf>>, 14 pages. Proceedings of the TREC Video Retrieval Evaluation (TRECVID), Nov. 13, 2006, pp. 1-14.
Ayache, Quenot, Satoh, "Context-Based Conceptual Image Indexing", retrieved on Apr. 16, 2010 at <<http://citeseerx.ist.psu.edu/viewdoc/download?doi=10.1.1.143.132&rep=rep1&type=pdf>>, IEEE Proceeding of Conference on Speech and Signal Processing (CASSP), vol. 2, May 2006, pp. 1-8.
Ayache, Quenot, "Evaluation of Active Leaning Strategies for Video Indexing", retrieved on Apr. 16, 2010 at <<htp://mrim.imag.fr/publications/2007/AYA07/cbmi07a.pdf>>, Image Communication, vol. 2, No. 7-8, Aug. 2007, pp. 692-704.
Barnard, Duygulu, Forsyth, "Clustering Art", retrieved on Apr. 16, 2010 at <<http://citeseerx.ist.psu.edu/viewdoc/download?doi=10.1.1.63.2259&rep=rep1&type=pdf>>, IEEE Proceedings of Conference on Computer Vision and Pattern Recognition, vol. II, 2001, pp. 434-441.

(Continued)

*Primary Examiner* — Hua Fan
(74) *Attorney, Agent, or Firm* — Carole A. Boelitz; Micky Minhas

(57) ABSTRACT

Methods and systems for active image tagging are usable to build large datasets of tagged images by combining manual tagging by a user and automatic tagging by a computing device based on the manual tagging. Such tags may be used to effectively sort, organize, link, and search for images within large datasets of images. Additionally, the active image tagging may be configured to utilize a tagging game where multiple users manually tag images by playing a game on a computing device.

20 Claims, 5 Drawing Sheets

(56) References Cited

OTHER PUBLICATIONS

Barnard, Forsyth, "Learning the Semantics of Words and Pictures", retrieved on Apr. 16, 2010 at http://luthuli.cs.uiuc.edu/~daf/papers/WAP-fin.pdf>>, IEEE Conference on Computer Vision (ICCV), vol. 2, Jul. 7, 2001, pp. 1-8.

Budura, Michel, Cudre-Mauroux, Aberer, "Neighborhood-based Tag Prediction", retrieved on Apr. 16, 2010 at <<http://people.csail.mit.edu/pcm/papers/TagPrediction.pdf>>, Proceedings of European Semantic Web Conference (ESWC), May 31, 2009, pp. 1-15.

Carson, Ogle "Storage and Retrieval of Feature Data for a Very Large Online Image Collection", retrieved on Apr. 16, 2010 at <<http://db.cs.berkeley.edu/papers/debull96-chabot.pdf>>, IEEE, Bulletin of the IEEE Computer Society Technical Committee on Data Engineering. 1996, pp. 19-27.

Chang, Lin, "LIBSVM: a Library for Support Vector Machines", retrieved on Apr. 16, 2010 at <<http://citeseerx.ist.psu.edu/viewdoc/download?doi=10.1.1.66.2871&rep=rep1&type=pdf>>, 2001, pp. 1-26. (Software availble at http://www.csie.ntu.edu.tw/~cjlin/libsvm).

Cilibrasi, Vitanyi, "The Google Simiarity Distance", retrieved on Apr. 16, 2010 at <<http://www.google.co.in/url?sa=t& source=web& ct=res&cd=1&ved=0CAcQFjAA& url=http%3A%2F%2Fciteseerx.ist.psu. edu%2Fviewdoc%2Fdownload%3Fdoi3D10.1.1.103. 5910%26rep%3Drep1%26type%3Dpdf&rct=j& q=The+google+similarity+distance&ei=YzTIS4PzHs35-Aano9zcCg&usg=AFQjCNG-YZvbAO\_ DmdHaczZgLwz8oGMfdA>>, IEEE Information Theory Workshop (ITSOC), Aug. 2005, pp. 1-16.

"Corbis—Stock Photography, Illustration and Footage", retrieved on Apr. 16, 2010 at <<http://www.corbis.com/>>, Corbis Corporation, 2002-2010, pp. 1.

Diakopoulos, Chiu, "PhotoPlay: A Collocated Collaborative Photo Tagging Game on a Horizontal Display", retrieved on Apr. 16, 2010 at <<http://www.fxpal.com/publications/FXPAL-PR-07-414.pdf>>, Proceedings Addendum of Conference on User Interface Software Technology (UIST), Oct. 2007, pp. 53-54.

Duygulu, Barnard, de Freitas, Forsyth, "Object Recognition as Machine Translation: Learning a Lexicon for a Fixed Image Vocabulary", retrieved on Apr. 16, 2010 at http://citeseerx.ist.psu.edu/viewdoc/download;jsessionid=76188B9D5B1F37EA1425E6F0A36A1718?doi=10.1.1.16.2014&rep=rep1&type=pdf>>, Springer-Verlag London, Lecture Notes in Computer Science (vol. 2353), Proceedings of Conference on Computer Vision, Part IV, 2002, pp. 97-112.

"Electronic Arts—Play Free Online Games, Internet Games, and Free Games / Pogo Games", retrieved on Apr. 16, 2010 at <<http://www.pogo.com>>, Electronic Arts Inc., 2010, pp. 1.

Engelson, Dagan, "Minimizing Manual Annotation Cost in Supervised Training From Corpora", retrieved on Apr. 16, 2010 at <<http://acl.ldc.upenn.edu/P/P96/P96-1042.pdf>>, Association for Computational Linguistics, Proceedings of Annual Meeting of the ACL, 1996, pp. 319-326.

Fellbaum (ed.) "Wordnet: An Eeconic Lexical Daabase", retrieved on Apr. 16, 2010 at <<http://acl.ldc.upenn.edu/J/J99/J99-2008.pdf>>, Computational Linguistics: Book Review, vol. 25, No. 2, pp. 292-296.

"Flickr", retrieved on Apr. 16, 2010 at <<http://www.flickr.com, Yahoo! Inc., 2010, pp. 1.

Forsyth, Fleck, "Finding Naked People", retrieved on Apr. 16, 2010 at http://citeseerx.ist.psu.edu/viewdoc/download;jsessionid=A8AC456AB8361439A79515E875358FDC?doi=10.1.1.52.1561&rep=rep1&type=pdf>>, Springer-Verlag, 1996, pp. 593-602.

"Google Inc", retrieved on Apr. 17, 2010 at <<http://www.google.com, Google, 2010, pp. 1.

Gosselin, Cord, "A Comparison of Active Classification Methods for Content-Based Image Retrieval", retrieved on Apr. 16, 2010 at http://citeseerx.ist.psu.edu/viewdoc/download?doi=10.1.1.5.3813& rep=rep1&type=pdf>>, ACM, Proceedings of Workshop on Computer Vision Meets Databases (CVDB), vol. 66, 2004, pp. 51-58.

Hua, Qi, "Online Multi-Label Active Annotation: Towards Large-Scale Content-Based Video Search", retrieved on Apr. 16, 2010 at <<http://delivery.acm.org/10.1145/1460000/1459379/p141-hua.pdf?key1=1459379&key2=5187141721&coll=GUIDE& dl=GUIDE&CFID=84519982&CFTOKEN=98986135>>, ACM, Proceeding of Conference on Multimedia (MM), Oct. 2008, pp. 141-150.

Ivanov, Vajda, Goldmann, Lee, Ebrahinni, "Object-based Tag Propagation for Semi-Automatic Annotation of Images", retrieved on Apr. 16, 2010 at <<http://delivery.acm.org/10.1145/1750000/1743471/p497-ivanov.pdf?key1=1743471key2=603404172&coll=GUIDE& dl=GUIDE&CFID=86381864&CFTOKEN=89192838>>, ACM, Proceedings of Conference on Multimedia Information Retrieval (MIR), Mar. 29, 2010, pp. 497-505.

Kraaij, Over, "TRECVID—2005 High-Level Feature Task: Overview", retrieved on Apr. 16, 2010 at <<http://www-24.nist.gov/projects/tvpubs/tv5.papers/tv5.hlf.slides.final.pdf>>, TRECVID, 2005, pp. 1-32.

Lempel, Soffer, "PicASHOW: Pictorial Authority Search by Hyperlinks on the Web", retrieved on Apr. 16, 2010 at <<http://www.eecs.harvard.edu/~michaelm/CS222/picashow.pdf>>, ACM, Transactions on Information Systems, vol. 20, No. 1, Jan. 2002, pp. 1-24.

Lewis, Gale, "A Sequential Algorithm for Training Text Classifiers", retrieved on Apr. 16, 2010 at <<http://citeseerx.ist.psu.edu/viewdoc/download?doi=10.1.1.16.3103&rep=rep1&type=pdf>>, Springer-Verlag New York, Proceedings of Conference on Research and Development in Information Retrieval, 1994, pp. 3-12.

Lin, Tseng, Smith, "Video Collaborative Annotation Forum: Establishing Ground-Truth Labels on Large Multimedia Datasets", retrieved on Apr. 16, 2010 at <<http://www-nlpir.nist.gov/projects/tvpubs/tvpapers03/ibm.final2.paper.pdf>>, TRECVID 2003 Workshop Notebook Papers, Nov. 2003, pp. 18-21.

Liu, Wang, Hua, Zhang, "Smart Batch Tagging of Photo Albums", retrieved on Apr. 16, 2010 at <<http://delivery.acm.org/10.1145/1640000/1631420/p809-liu.pdf?key1=1631420 &key2=4163041721&coll=GUIDE&dl=GUIDE &CFID=86380382&CFTOKEN=42728048>>, ACM, Proceedings of Conference on Multimedia (MM), Oct. 19, 2009, pp. 809-812.

"Microsoft Corporation—MSN Games—Free Online Games", retrieved on Apr. 17, 2010 at <<http://zone.msn.com>>, Microsoft Corporation, 2010 pp. 1.

Milliman, "Website Accessibility and the Private Sector: Disability Stakeholders Cannot Tolerate 2% Access!", retrieved on Apr. 19, 2010 at <<http://people.rit.edu/easi/itd/itdv08n2/milliman.htm>>, Information Technology and Disabilities (ITD) Journal, vol. 8, No. 2, 2002, pp. 1-5.

Naphade, Smith, Tesic, Chang, Hsu, Kennedy, Hauptmann, Curtis, "Large-Scale Concept Ontology for Multimedia", retrieved on Apr. 16, 2010 at <<http://www.ee.columbia.edu/In/dvmm/publications/06/naphade06largescale.pdf>>, IEEE Computer Society, IEEE Multimedia, vol. 13, No. 3, Jul. 2006, pp. 86-91.

Naphade, Smith, "On the Detection of Semantic Concepts at TRECVID", retrieved on Apr. 16, 2010 at <<http://delivery.acm.org/10.1145/1030000/1027680/p660-naphade.pdf?key1=1027680& key2=3487141721&coll=GUIDE&dl=GUIDE& CFID=86408519& CFTOKEN=83914860>>, ACM, Proceedings of Conference on Multimedia (MM), Oct. 2004, pp. 660-667.

O'Connor, O'Connor, "Categories, Photographs & Predicaments: Exploratory Research on Representing Pictures for Access", retrieved on Apr. 17, 2010 at <<http://www3.interscience.wiley.com/journal/109861519/abstract?CRETRY=1&SRETRY=0>>, John Wiley & Sons Inc., Bulletin of the American Sociey for Information Sicence and Technology, vol. 25, No. 6, 1999, pp. 17-20.

Quenot, "Computation of Optical Flow Using Dynamic Programming", retrieved on Apr. 16, 2010 at <<http://citeseerx.ist.psu.edu/viewdoc/download?doi=10.1.1.40.6558&rep=rep1&type=pdf>>, Proceedings of Workshop on Machine Vision Applications (IAPR), 1996, pp. 249-252.

"Random Bounce Me Website—Online Discounts", retrieved on Apr. 17, 2010 at http://Old.net/>>, Old.net, 2010, pp. 1.

(56) References Cited

OTHER PUBLICATIONS

Russell, Torralba, Murphy, Freeman, "LabelMe: a database and web-based tool for image annotation", retrieved on Apr. 16, 2010 at <<http://www.springerlink.conn/index/76X9J562653K0378.pdf>>, Kluwer Academic Publishers, International Journal of Computer Vision, vol. 77, No. 1-3, May 2008, pp. 157-173.

Schneiderman, "Object Detection Using the Statistics of Parts", retrieved on Apr. 17, 2010 at http://www.wadespires.com/wp-content/uploads/2009/07/stat_of_parts.pdf>>, Springer, International Journal of Computer Vision (Presentation: CAP '05), vol. 56, No. 3, Feb. 2004, pp. 151-177.

Seneviratne, lzuierdo, "Image Annotation Through Gaming", retrieved on Apr. 16, 2010 at <<http://ftp.informatik.rwth-aachen.de/Publications/CEUR-WS/Vo1-379/paper8.pdf>>, IEEE Press, Proceedings of Conference on Digital Signal Processing, 2009, pp. 940-945.

Seung, Opper, Sompolinsky, "Query by Committee", retrieved on Apr. 16, 2010 at <<http://hebb.mit.edu/people/seung/papers/query.pdf>>, ACM, Proceedings of Workshop on Computational Learning Theory, 1992, pp. 287-294.

Souvannavong, Merialdo, Huet, "Partition Sampling for Active Video Database Annotation", retrieved on Apr. 16, 2010 at <<http://citeseerx.ist.psu.edu/viewdoc/download?doi=10.1.1.1.1562&rep=rep1&type=pdf>>, IEEE Proceedings on Vision, Image and Signal Processing, vol. 152, No. 3, Jun. 3, 2005, pp. 347-355.

Stork, Lam, "Open Mind Animals: Ensuring the Quality of Data Openly Contributed Over the World Wide Web", retrieved on Apr. 17, 2010 at <<http://www.openmind.org/papers/OpenMindAAAI.typeset.pdf>>, American Association for Artificial Intelligence, 2000, pp. 1-6.

"The Open Mind Initiative", retrieved on Apr. 17, 2010 at <<http://www.openmind.org/>>, openmind.org, 2001, pp. 1-2.

Tong, Chang, "Support Vector Machine Active Learning for Image Retrieval", retrieved on Apr. 16, 2010 at <<http://portal.acm.org/citation.cfm?id=500159>>, ACM, Proceedings of Conference on Multimedia (MM), 2001, pp. 107-118.

Volkmer, Smith, Natsev, "A Web-based System for Collaborative Annotation of Large Image and Video Collections", retrieved on Apr. 16, 2010 at <<http://delivery.acm.org/10.1145/1110000/1101341/p892-volkmer.pdf?key1=1101341&key2=3248141721&coll=GUIDE&dl=GUIDE&CFID=84521075&CFTOKEN=45184184>>, ACM, Proceedings of Conference on Multimedia (MM), 2005, pp. 892-901.

von Ahn, Dabbish, "Labeling Images with a Computer Game", retrieved on Apr. 16, 2010 at <<http://portal.acm.org/citation.cfm?id=985692.985733>>, ACM, Proceedings of Conference on Human Factors in Computing Systems (CHI), Apr. 2004, pp. 319-326.

Wang, Zhang, "Label Propagation Through Linear Neighborhoods", retrievd on Apr. 16, 2010 at <<http://citeseerx.ist.psu.edu/viewdoc/download?doi=10.1.1.76.3431&rep=rep1&type=pdf>>, ACM, Proceedings of Conference on Machine Learning, 2006, pp. 985-992.

Wu, Hua, Yu, Ma, Li, "Flickr Distance", retrieved on Apr. 16, 2010 at <<http://research.microsoft.com/en-us/um/people/xshua/publications/pdf/2008_acmmm_flickrdistance.pdf>>, ACM, Proceedings of Conference on Multimedia (MM), Oct. 2008, pp. 31-40.

Wu, Kozintsev, Bouguet, Dulong, "Sampling Strategies for Active Learning in Personal Photo Retrieval", retrieved on Apr. 16, 2010 at <<http://www.cecs.uci.edu/~papers/icme06/pdfs/0000529.pdf>>, IEEE Conference on Multimedia and Expo (ICME), Jul. 2006, pp. 529-532.

"Yahoo!, Inc. Yahoo! Games", retrieved on Apr. 17, 2010 at <<http://games.yahoo.com>>, Yahoo! Inc., 2010, pp. 1-11.

Yan, Natsev, Campbel, "A Learning-based Hybrid Tagging and Browsing Approach for Efficient Manual Image Annotation", retrieved on Apr. 16, 2010 at <<http://mplab.ucsd.edu/wordpress/wp-content/uploads/CVPR2008/Conference/data/papers/040.pdf>>, IEEE Computer Society, Conference on Computer Vision and Pattern Recognition (CVPR), Aug. 2008, pp. 1-8.

"YouTube—Broadcast Yourself", retrieved on Apr. 16, 2010 at <<http://www.youtube.com>>, YouTube LLC, 2010, pp. 1-2.

Yuan, Hua, Wang, Wu, "Manifold-Ranking Based Video Concept Detection on Large Database and Feature Pool", retrieved on Apr. 16, 2010 at <<http://delivery.acm.org/10.1145/1190000/1180768/p623-yuan.pdf?key1=1180768&key2=7518181721&coll=GUIDE&dl=GUIDE&CFID=86408922&CFTOKEN=93633406>>, ACM, Proceedings of Conference on Multimedia (MM), Oct. 2006, pp. 623-626.

Zhou, Cheung, Xue, Qiu, "Collaborative and Content-based Image Labeling", retrieved on Apr. 16, 2010 at <<http://figment.cse.usf.edu/~sfefilat/data/papers/TuAT8.6.pdf>>, IEEE Conference on Pattern Recognition (ICPR), Dec. 8, 2008, pp. 1-4.

Zhou, Bousquet, Lal, Weston, Scholkopf, "Learning with Local and Global Consistency", retrieved on Apr. 16, 2010 at <<http://books.nips.cc/papers/files/nips16/NIPS2003_AA41.pdf>>, Max Planck Institute for Biological Cybernetics, Jun. 2003, pp. 1-8.

* cited by examiner

ACTIVE IMAGE TAGGING

BACKGROUND

With rapid advances in digital storage devices, networks, and data compression techniques, the volume of digital images throughout the world has been ever growing and rapidly expanding. Additionally, due to the widespread household use of personal computers and the World Wide Web (Web), digital images are regularly uploaded, downloaded, shared, and searched for among Web users. Thus, it is no surprise that the Web has become an enormous repository of data including, in particular, digital images. To effectively manage this voluminous amount of digital images, a promising approach is to annotate them with keywords.

Concept labeling and ontology-free tagging (tagging) are the two typical manners of image annotation. Concept labeling involves presenting an image and a corresponding set of fixed keywords to a user and allowing the user to determine each keyword's relevance. On the other hand, tagging involves allowing users to create image tags independent of any domain-specific rules. However, despite extensive research, efforts have been mainly dedicated towards advancing concept labeling. Unfortunately, automatic image labeling algorithms are still far from satisfactory and manual labeling is rather labor-intensive. In contrast, however, tagging offers more freedom to users and provides a better experience during manual annotation.

Unfortunately, adequate tools do not exist for effectively and/or efficiently tagging digital images on the Web. Existing tagging tools merely provide manual tagging scenarios.

BRIEF SUMMARY

This summary is provided to introduce simplified concepts for active image tagging, which are further described below in the Detailed Description. This summary is not intended to identify essential features of the claimed subject matter, nor is it intended for use in determining the scope of the claimed subject matter. Generally, the active image tagging described herein involves combining manual tagging with automatic sample selection and tag prediction to actively tag digital images that exist on the Web.

In one implementation, active image tagging may be effectuated by iteratively selecting a file stored in memory, providing the file to a user for manual tagging, receiving a user-tagged file in return, and storing the user-tagged file in memory. Additionally, a tag for another file may be created by predicting a tag for the other file based on the user-tagged file, and the other file with the newly predicted tag may also be stored in the memory. The files may be, for example, image files and they may be selected from a subset of data. Moreover, in some examples, an informativeness measure made up of an ambiguity measure, a citation measure, and/or a diversity measure may be used to select the files for manual tagging.

In another implementation, an active image tagging method may iteratively select a file, from a dataset or a subset of the dataset, provide the file to a file tagging game, receive a game-tagged file from the tagging game, and store the game-tagged file in memory. Additionally, in some examples, a tag for another file may be predicted based on the game-tagged file, and the other file may be stored in the memory. Additionally, in some examples, the method may host the file tagging game, thus, providing the file to one or more users and receiving, and also storing, the game-tagged files only after at least two game participants agree on a tag for the file.

In yet another implementation, an active image tagging system may be configured to iteratively select an image file from a subset of data stored in memory, provide the selected image file to a user for manual tagging, and automatically predict image tags for other images based on the user-tagged images until no untagged images remain in the subset. Additionally, in some examples, the system may be further configured to provide the selected image to an image tagging game for manual tagging. Furthermore, in some examples, the system may be configured to base image selection on an informativeness measure, which may be an ambiguity measure, a citation measure, and/or a diversity measure, for example.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
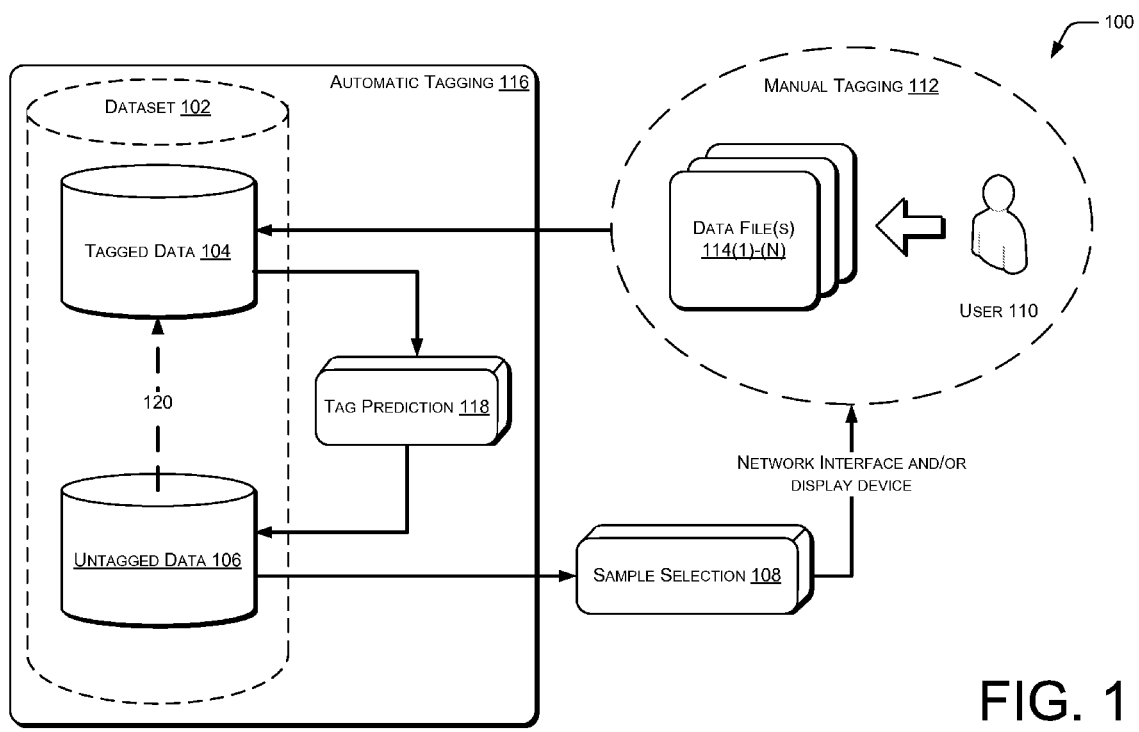
FIG. 1 is a block diagram illustrating an example of active image tagging.

This disclosure describes active image tagging. In particular, systems and iterative methods are presented for selecting an image from a subset of a dataset of image files, providing the image to a user for manual tagging, receiving the manually tagged image, storing the manually tagged image in the subset, predicting tags for untagged images in the subset, and storing the newly tagged images in the subset. In some examples the iterative process may continue until no untagged images remain in the subset. Additionally or alternatively, new subsets may be iteratively created that contain other untagged images from the data set, such that the entire process may continue until all images in the data set have been tagged. In other examples, less than all images in a dataset or a subset may be tagged.

As discussed above, image annotation is essential for effectively managing the ever growing volume of digital images that can be found on the Web. However, automatic annotation algorithms are ineffective for large datasets and manual concept labeling is time consuming, restrictive (due its inherent lack of user freedom), and often times boring. These problems, and the need for accurate image tagging, are compounded by the ever increasing size of the Internet. Accordingly, there is a need for active image tagging systems and methods that are robust enough to effectively, accurately, and efficiently tag a large amount of digital image data.

The techniques described in this disclosure may be used for effectively solving the foregoing problems by selecting a sample of the most informative images within a dataset of digital images, providing the images from the sample to a user for manual tagging, and predicting tags for other images in the dataset based on the user-defined tags. Additionally, tagging games, such as the Extra Sensory Perception (ESP) game or other game scenarios, may be used to encourage or enhance the manual tagging process. For example, a set of users may be presented the same image at the same time in a timed-game format such that they are awarded points for quickly providing image tags that match with the other user's provided tags. In other words, a first and second user may be awarded a specific point value when, and if, they each independently enter the same tag for a specific image within the allotted time. Once the users enter matching tags, the entered tag may be stored as a game-defined tag for that image.

Selecting a sample of images from the dataset entails utilizing pre-defined selection criteria to appropriately create effective samples, or subsets, of images. The pre-defined selection criteria may include a citation measure which defines the number of images neighboring a given image, an ambiguity measure which defines the similarities between tags of each neighboring image, and/or a diversity measure which defines the difference between the tags of each file in a sample and the tag of a given image. The application also discloses a nested iterative process for image tagging, which may begin with sample selection based on these criteria and may end when all data in the dataset have been tagged. Additionally, once the sample is selected, an iterative process may begin by providing the sample to a user, or group of users, and may end when all data in the sample has been tagged.

FIG. 1 is an illustrative block diagram illustrating active image tagging 100. By way of example only, a dataset 102 may contain digital images stored in a memory on a computing device (not shown) such as a personal computer, Web server, or the like. Dataset 102 may be made up of tagged data 104 and/or untagged data 106. Both tagged data 104 and untagged data 106 may comprise digital image files, digital video files, digital music files, or any type of digital file that may be tagged with annotations. For purposes of discussion only, and not limitation, this disclosure will hereinafter refer to all data files as image files. In some implementation, for example, the dataset 102 may contain only tagged images 104, only untagged images 106, or a combination of both tagged images 104 and untagged images 106.

In one implementation, sample selection 108 is performed on the untagged images 106 of the dataset 102 in order to select a subset of images to be provided to a user 110. By way of example only, and not limitation, sample selection 108 may comprise calculating an ambiguity measure, a citation measure, a diversity measure, or combinations of the like, for each image of the untagged images 106 and/or the dataset 102. Also by way of example only, sample selection 108 may provide the subset of images to the user 110 via a network interface and/or a display of a client device. That is, the user 110 may view the images on a display of a client device connected directly to the memory containing the dataset 102 or the dataset 102 may reside on a Web server, or other network server, that is remote to the client device.

In one implementation, during manual tagging 112, the user 110 may provide ontology-free tags for the data file(s) (hereinafter image(s)) 114(1)-(N) that are presented to them. In one implementation, the user 105 may be required to provide tags for all images 114(1)-(N) in the subset of untagged images 106. However, in another implementation, the user 110 may provide tags for only some images 114(1)-(N) in the subset. Once manual tagging 112 has completed the user-tagged images 114(1)-(N) may be transmitted back to the dataset 102 for automatic tagging 116.

By way of example only, during automatic tagging 116, tag prediction 118 may iteratively predict new tags for all, or some, of the images in the dataset 102. In one implementation, tag prediction 118 may predict tags for untagged images 106, thus increasing the number of tagged images 104. In this way, untagged images 106 are transformed into tagged images 104 (represented by dotted line 120). In another implementation, tag prediction 118 may automatically tag all images in the dataset 102, including already tagged images. In this way, new tags may be predicted for already tagged images 104 and incorrectly predicted tags may be corrected. By way of example, and not limitation, the iterative process may repeat until all images in the dataset 102 are tagged or until all images in the dataset 102 are correctly tagged; that is, until every image tag is predicted correctly. In one implementation, after the iterative automatic tagging 116 ends, new untagged images 106 may be added to the dataset 102. In this case, sample selection 108 may create new subsets to be sent to a user 110 for another round of manual tagging.

Figure 2:
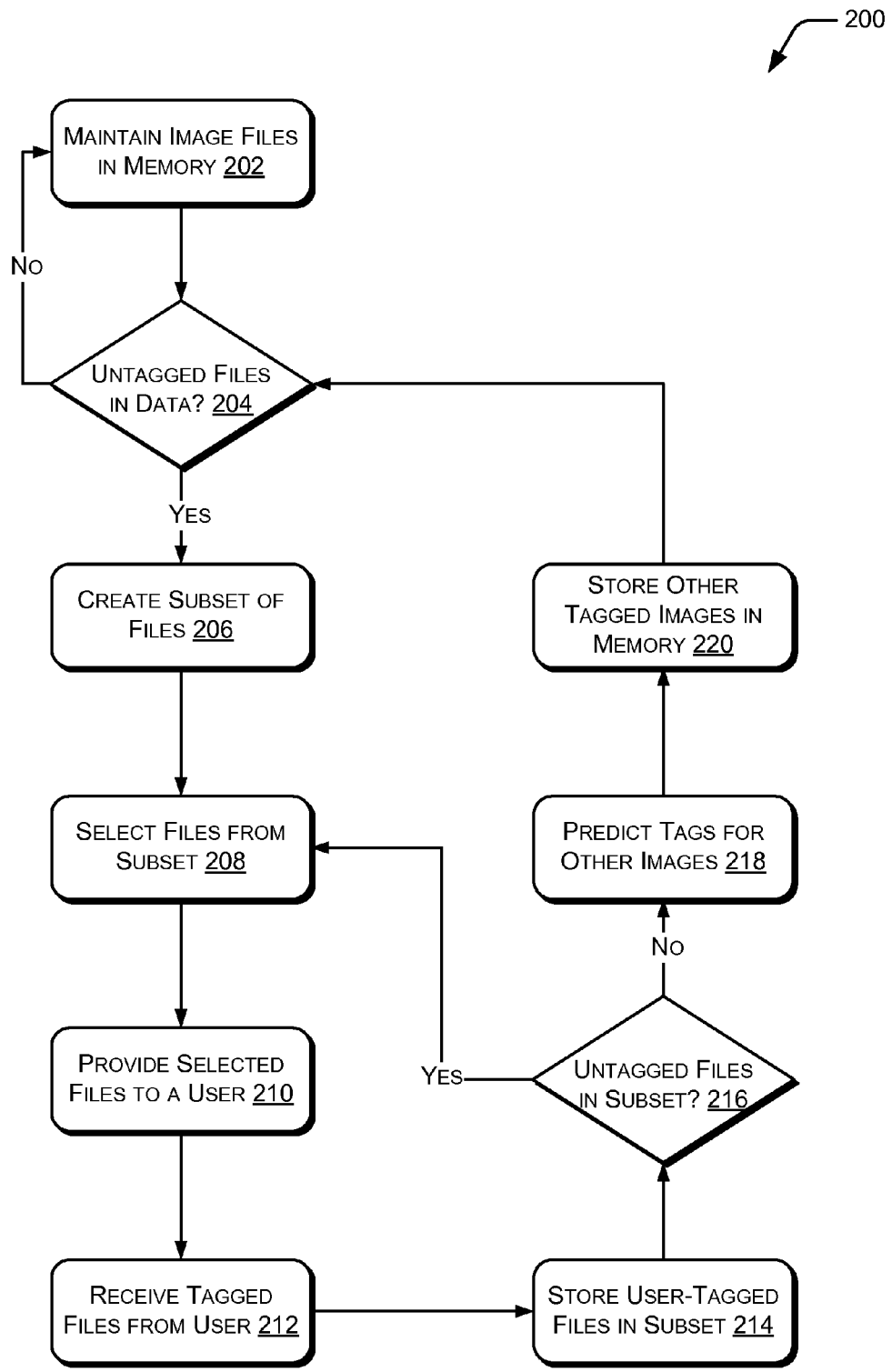
FIG. 2 is a flowchart illustrating details of the active image tagging of FIG. 1.

FIG. 2 is a flow diagram of one illustrative method 200 for implementing the active image tagging 100 of FIG. 1. As discussed above, active image tagging 100 may be responsible for iteratively, and automatically, tagging images within a dataset based on user-provided tags. In this particular implementation, the method 200 may begin at block 202, in which the method 200 may maintain image files in a memory. For example, as shown in FIG. 1, the image files may be stored in a dataset 102. By way of example only, the method 200 may determine whether any untagged images exist in the dataset 102 at decision block 204. If no untagged images exist in the dataset 102, meaning that all images have been tagged, method 200 may continue to maintain the image files in memory at block 202. Alternatively, decision block 204 may determine whether all tagged files in the dataset 102 are correctly tagged. If so, method 200 may continue to maintain the image files as if all the images are tagged.

On the other hand, if the method 200 determines that untagged files exist in the dataset 102, or some image files are incorrectly tagged, the method 200 may create a subset of image files at block 206 prior to selecting files at block 208. In one implementation, however, the method 200 may omit the subset creation of block 206 and proceed directly to selecting files at block 208.

By way of example, and not limitation, the method 200 may then provide the selected files to a user, or group of users, at block 210. The user may perform ontology-free tagging, or even image labeling, to annotate the image files. This step may be performed independent of the method 200, or the method 200 may effectuate the manual tagging implementation by causing display of the image on a display with a text field for the user and receiving the annotation directly. In one implementation, at block 212, the method 200 may receive the user-tagged image file and then store the user-tagged image files in the subset at block 214. In some instances, however, no subset is created and the user-tagged image files may then be stored in the dataset 102 rather than in the subset. When a subset is used, at decision block 216, the method 200 determines whether untagged images exist in the subset. If untagged images exist in the subset, meaning at least some of the images in the subset have yet to be manually tagged, the method 200 may select additional files from the subset at block 208. Thus, the method 200 may iteratively repeat these steps until all images in the subset are manually tagged by a user.

On the other hand, if no untagged images exist in the subset, meaning all images in the subset have been manually tagged by a user, the method 200 may predict tags for the other images in the dataset 102 at block 218. In this way, the method 200 may perform the automatic tagging 116 of FIG. 1. By way of example only, at block 220, the method 200 may store the newly tagged images in the memory. For example, the other tagged images may be stored in the dataset 102 of FIG. 1. Following block 220, the method 200 may continue to determine whether untagged files exist in the dataset 102 at decision block 204 once again. In this way, the active image tagging method 200 may be iteratively performed until all images in the dataset 102 are tagged.

FIGS. 1 and 2 provide simplified examples of suitable methods for active image tagging according to the present disclosure. However, other configurations are also possible. For example, while manual tagging 112 is shown with one user 110, this may be performed by multiple independent users or by groups of users. Additionally, image file(s) 114 (1)-(N) may comprise multiple tags for each image file 114 (1)-(N).

Illustrative Active Sample Selection and Tag Prediction

As shown in FIG. 1, sample selection and tag prediction are two main components of active image tagging. To that end, several calculations may be helpful using the following variables: C, the set of all images; $\mathcal{L}$, the set of all manually tagged images; and U, the set of all yet-to-be-tagged images. Given n images where $C = \{x_1, x_2, \ldots, x_n\}$, the target may be to provide tags for all images. Supposing that the first l images have been manually tagged, $\mathcal{L} = \{x_1, x_2, \ldots, x_l\}$ and $U = \{x_{l+1}, x_{l+2}, \ldots, x_n\}$. For each $x_i$ in $\mathcal{L}$, it may be associated with a set of tags, $T_i$, where T is the global tag set and $T = \{t_1, t_2, \ldots, t_m\}$ (i.e., there are m tags in all). Thus, the sample selection and tag prediction components may move a batch of samples from U to $\mathcal{L}$ and predict the tags of the samples in U.

As discussed above, a sample selection of untagged images may be provided to a user, or group of users, for manual tagging based on an informativeness measure. In other words, the most informative images may be selected from the dataset, or a subset of the dataset, for manual tagging. In one implementation, the informativeness measure may be based on an ambiguity measure, a citation measure, a diversity measure, combinations thereof, or the like.

By way of example only, the ambiguity measure of each image may be determined by analyzing the respective tags of each neighboring image within the dataset or subset. For example, there may be $k_i$ manually tagged images in the neighborhood of $x_i$, and there may be $m_i$ tags associated with these images. Thus, the appearance probabilities of each tag may be denoted as $P_1, P_2, \ldots, P_{m_i}$. An appearance probability defines the likelihood of that tag appearing in the neighborhood. For example, if there are ten tagged samples in the neighborhood and two of them contain the tag "apple," then its appearance probability will be 1/5. Based on these parameters, the ambiguity measure of $x_i$ may be defined as:

$$\text{ambiguity}(x_i) = 1 - \frac{k_i}{K} - \frac{k_i}{K} \frac{\sum_{j=1}^{m_i} P_j \log P_j + (1-P_j)\log(1-P_j)}{m_i} \quad (1)$$

The citation measure of an image may be defined as the number of images that has taken each image as a neighbor, and may be described as:

$$\text{citation}(x_i) = \frac{\sum_{j=1}^{n} I(x_j \in N_i)}{n} \quad (2)$$

where I(.) is the indicator function (I(true)=1 and I(false)=0) and $N_I$ is the k-nearest neighborhood of $x_i$. This criterion aims to select the images with high citation values, which may help predict the tags of more images.

The diversity criterion may enforce the selected samples to be diverse and may keep a variety of images from being constrained within restricted areas by determining the difference between tags of images in a sample from the tag of each other image in the sample. Given a kernel K, the angle between the feature vectors of two samples $x_i$ and $x_j$ in feature space may be defined as:

$$\cos(<x_i, x_j>) = \frac{|K(x_i, x_j)|}{\sqrt{K(x_i, x_j)K(x_i, x_j)}} \quad (3)$$

and thus, adopting a Gaussian kernel, the diversity measure for sample $x_i$ can be estimated as:

$$\text{diversity}(x_i) = 1 - \max_{x_j \in \mathcal{L}} \exp\left(-\frac{\|x_i - x_j\|^2}{\sigma^2}\right) \quad (4)$$

By way of example only, and not limitation, the informativeness measure may be a linear combination of the above measures. In this way, the sample selection may be performed based on the following equation:

$$\text{informativeness}(x_i) = \alpha \times \text{ambiguity}(x_i) + \beta \times \text{diversity}(x_i) + (1-\alpha-\beta) \times \text{citation}(x_i) \quad (5)$$

however, other combinations, including non-linear combinations, of the ambiguity measure, diversity measure, and citation measure may also be used to calculate the informativeness measure.

In one implementation, tag prediction may be performed with two random walk processes. Image and tag graphs may be constructed (i.e., similarity matrices) and, as noted above, $N_i$ is the k-nearest neighborhood of $x_i$. Additionally, an image affinity matrix $W^I$ may be constructed. $W^I$ may be defined by:

$$W_{ij}^I = \exp\left(-\frac{\|x_i - x_j\|^2}{\sigma^2}\right) \quad (6)$$

if $i \neq j$ and $x_j \in N_i$, and $W_{ii}^I$ is set to 0.

A tag graph may be constructed by mining data from a Web site or a Web server and the distance between two tags $t_i$ and $t_j$ may be calculated as follows:

$$d(t_i, t_j) = \exp\left(-\frac{\max(\log f(t_i), \log f(t_j)) - \log f(t_i, t_j)}{\log G - \min(\log f(t_i), \log f(t_j))}\right) \quad (7)$$

where $f(t_i)$ and $f(t_j)$ are the numbers of images containing tag $t_i$ and $t_j$ respectively, $f(t_i, t_j)$ is the number of images containing both $t_i$ and $t_j$, and G is the total number of images on the Web site or Web server. In one implementation, these numbers can be obtained by performing a tag-based search on the Web site or Web server. Thus, the concurrence similarity between $t_i$ and $t_j$ is then defined as:

$$W_{ij}^T = \exp(-d(t_i, t_j)) \quad (8)$$

In another implementation, however, the tag graph construction may be performed by other methods, such as by using word similarity calculations or distance based calculations.

By way of example only, a diagonal matrix may be formed based on the image affinity matrix described above and the random walk process may iteratively walk the diagonal matrix until convergence, where $F_{ij}$ may be regarded as the initial relevance score $x_i$ with respect to $t_j$. After obtaining F, a tag-level random walk may then be performed to refine the relevance scores by leveraging the relationships of the tags. Much like the image-level random walk, the second random walk may iterate until convergence. For each image $x_i$, the relevance scores may then be ranked, and then the first r tags may be selected, where r is set to the average number of tags per image in $\mathcal{L}$.

Illustrative Computing Environment

Figure 3:
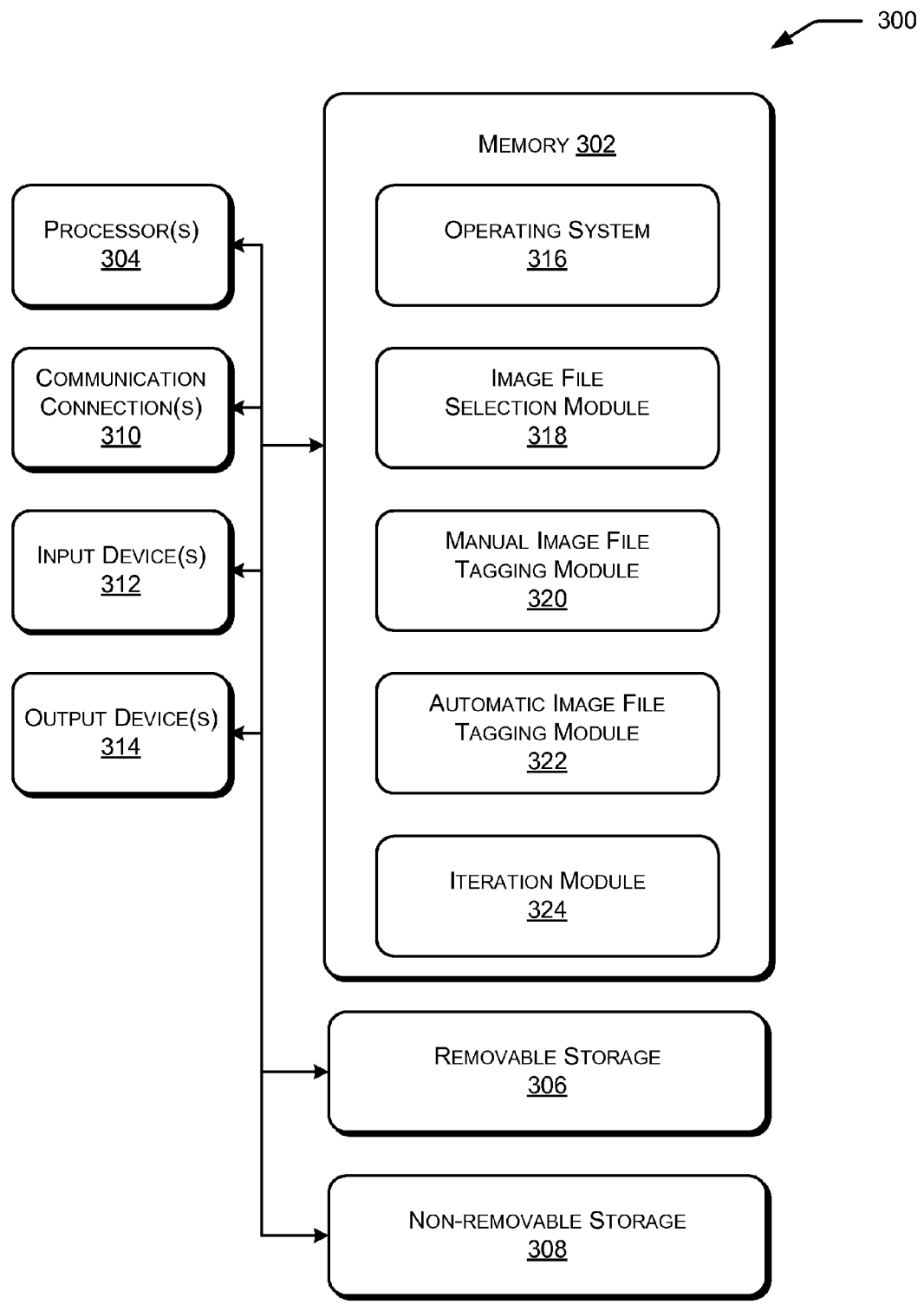
FIG. 3 is a block diagram of a computer environment showing an illustrative system in which active image tagging can be implemented.

FIG. 3 provides an illustrative overview of one computing environment 300, in which implementations of the disclosure may be implemented. The computing environment 300 may be configured as any suitable computing device capable of implementing an active image tagging system, and accompanying methods, such as, but not limited to those described with reference to FIGS. 1 and 2. By way of example and not limitation, suitable computing devices may include personal computers (PCs), servers, server farms, datacenters, or any other device capable of storing and executing all or part of the active tagging methods.

In one illustrative configuration, the computing environment 300 comprises at least a memory 302 and one or more processing units (or processor(s)) 304. The processor(s) 304 may be implemented as appropriate in hardware, software, firmware, or combinations thereof. Software or firmware implementations of the processor(s) 304 may include computer-executable or machine-executable instructions written in any suitable programming language to perform the various functions described.

Memory 302 may store program instructions that are loadable and executable on the processor(s) 304, as well as data generated during the execution of these programs. Depending on the configuration and type of computing device, memory 302 may be volatile (such as random access memory (RAM)) and/or non-volatile (such as read-only memory (ROM), flash memory, etc.). The computing device or server may also include additional removable storage 306 and/or non-removable storage 308 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 302 may include multiple different types of memory, such as static random access memory (SRAM), dynamic random access memory (DRAM), and/or ROM.

Memory 302, removable storage 306, and non-removable storage 308 are all examples of computer-readable storage media. Computer-readable storage media includes, but is not limited to, volatile and non-volatile, removable and non-removable media implemented in any method or technology for storage of information such as computer-readable instructions, data structures, program modules or other data. Memory 302, removable storage 306, and non-removable storage 308 are all examples of computer storage media.

Additional types of computer storage media that may be present include, but are not limited to, phase change memory (PRAM), SRAM, DRAM, other types of RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server or other computing device. Combinations of any of the above should also be included within the scope of computer-readable storage media.

The computing environment 300 may also contain communications connection(s) 310 that allow the computing environment 300 to communicate with a stored database, another computing device or server, user terminals, and/or other devices on a network. The computing environment 300 may also include input device(s) 312 such as a keyboard, mouse, pen, voice input device, touch input device, etc., and output device(s) 314, such as a display, speakers, printer, etc.

Turning to the contents of the memory 302 in more detail, the memory 302 may include an operating system 316 and one or more application programs or services for implementing active image tagging including an image file selection module 318. The image file selection module 318 may be configured to perform the sample selection described above with reference to FIGS. 1 and 2. For example, the image file selection module 318 may be configured to select images from a dataset or subset of images based on an informativeness measure.

The memory 302 may further include a manual image file tagging module 320. The manual image file tagging module 320 may be configured to provide the selected images to a user, or group of users, for manual tagging. In one example, the selected images may be provided to a display device of a client device. In another example, the selected images to a display device of a host computer, such as the computing environment 300. As discussed above, manual image tagging is but one way to provide image annotations. Additionally, the results of the manual image tagging may be provided by the manual image file tagging module 320 for processing by the active image tagging computing environment 300. In one implementation, the manual image file tagging module 320 may provide an image, or images, to a user for entering user-specified image tags. In another implementation, the manual image file tagging module 320 may provide an image, or images, to two or more users playing an image tagging game.

The memory 302 may further include an automatic image file tagging module 322 and an iteration module 324. As discussed above, the automatic image file tagging module 322 may be configured to predict tags for untagged images in a dataset based on the results of the manual image file tagging module 320. In one implementation, the automatic image file tagging module 322 may be responsible for automatically tagging all images in the dataset. In another implementation, the automatic image file tagging module 322 may be responsible for tagging all images stored in a memory. In yet another implementation, the automatic image file tagging module 322 may only be responsible for tagging untagged images from within a subset of a dataset. Additionally, in some implementations, the automatic image file tagging module 322 may predict tags for untagged images based on the two random walks described above. Yet, in other implementations, the automatic image file tagging module 322 may predict tags based on other methods.

The iteration module 324 may be configured to control multiple iterations of the active image tagging methods 100 and 200 described in relation to FIGS. 1 and 2. In one implementation, the iteration module 324 may be configured to control iterations of the entire image tagging process described above. In this way, the active image tagging methods may proceed iteratively until all images in the dataset are tagged. In other implementations, the iteration module 324 may be configured to control iterations of the tag prediction processes described above. In this way, the active image tagging methods may iteratively, and automatically, tag the untagged images based on the user-provided tags only after the automatic tagging has completed.

Illustrative Active Image Tagging with Manual Tagging Game

Figure 4:
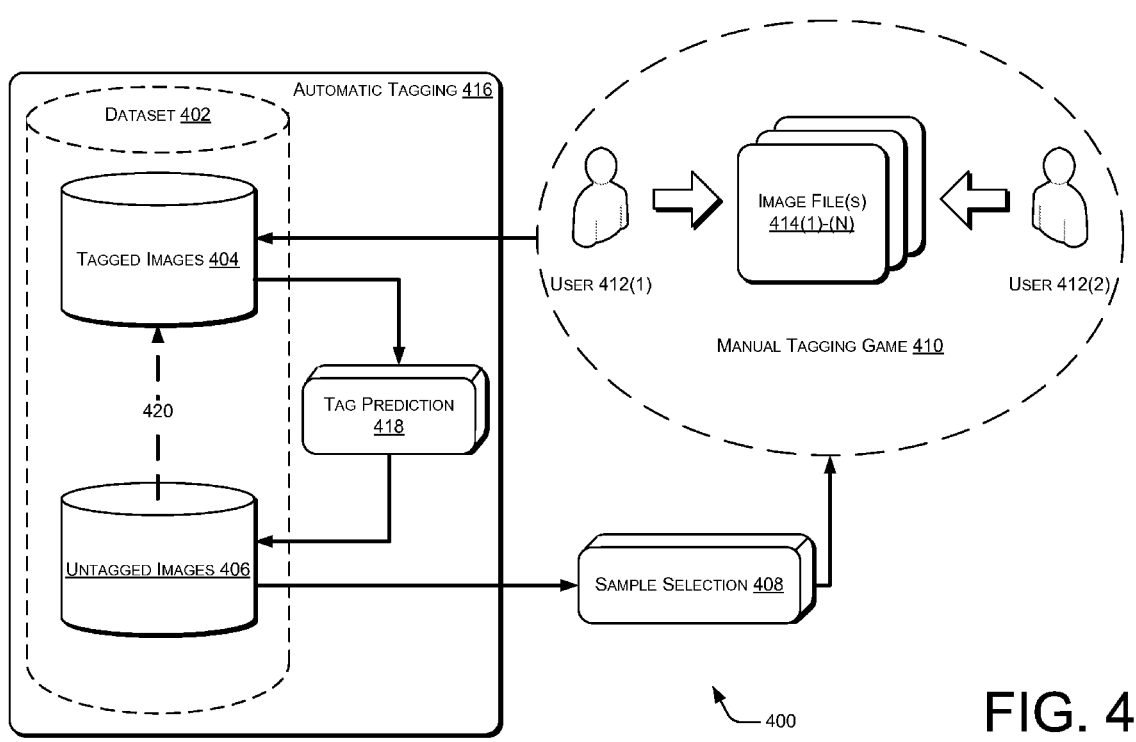
FIG. 4 is a block diagram illustrating an example of active image tagging using a manual tagging game.

FIG. 4 is an illustrative block diagram illustrating active image tagging with a manual image tagging game 400. Similar to that described with reference to FIG. 1, and by way of example only, a dataset 402 may contain digital images stored in a memory of a computing device such as a personal computer, Web server, or the like. Dataset 402 may be made up of tagged data 404 and/or untagged data 406. As discussed above, both tagged data 404 and untagged data 406 may comprise digital image files, digital video files, digital music files, and/or any type of digital file that may be tagged with annotations. In one implementation, for example, the dataset 402 may contain tagged images 404, such as after completion of active image tagging with manual image tagging game 400. In another implementation, the dataset 402 may contain untagged images 406, such as prior to implementing active image tagging with manual tagging game 400. Additionally, the dataset 402 may contain both tagged images 404 and untagged images 406 simultaneously, such as during implementation of active image tagging with manual tagging game 400.

By way of example only, in one implementation, sample selection 408 is performed on the untagged images 406 of the dataset 402 in order to select a subset of images to be provided to a manual tagging game 410. By way of example only, and not limitation, sample selection 408 may comprise calculating an ambiguity measure, a citation measure, a diversity measure, or combinations of the like, for each image of the untagged images 406 and/or the dataset 402. Also by way of example only, sample selection 408 may provide the subset of images to the manual tagging game 410 via a network interface and/or a display device.

The manual tagging game 410 may comprise two or more users 412(1), 412(2), . . . , 412(N). The users 412(1)-(N) may be presented with untagged images 406 or tagged images 404 (with correct or incorrect tags) for tagging. In one implementation, the manual tagging game 410 may provide the users 412(1)-(N) with one image 414 of the image file(s) 414(1)-(N) selected during sample selection 408 for a specific amount time. In an example with two users 412(1)-(2), if both users 412(1) and 412(2) enter the same tag for a given image 414 within the allotted time, the manual tagging game 410 may store the entered tag as the tag for the given image 414. On the other hand, if the two users 412(1) and 412(2) enter tags different than each other, the manual tagging game 410 may store the entered tags as possible tags, may store the tags as incorrect tags, or may discard the tags altogether. If no match between the two users 412(1) and 412(2) entered tags occurs during the allotted time, the presented image 414 may not be tagged and may return into the sample, or subset, as an untagged image 406. In one implementation, once all the images 414(1)-(N) are manually tagged by the manual tagging game 410 the game-tagged images 414(1)-(N) may be transmitted back to the dataset 402 for automatic tagging 416.

By way of example only, and not limitation, during automatic tagging 416, tag prediction 418 may iteratively predict new tags for all, or some, of the images in the dataset 402. In one implementation, tag prediction 418 may only predict tags for untagged images 406, thus increasing the number of tagged images 404. In this way, untagged images 406 are transformed into tagged images 404 (represented by dotted line 420). In another implementation, tag prediction 418 may automatically tag all images in the dataset 402, including already tagged images. As discussed with reference to FIG. 1, in this way, new tags may be predicted for already tagged images 404 and incorrectly predicted tags may be corrected. Also, as discussed above, and by way of example only, the iterative process may repeat until all images in the dataset 402 are tagged or until all images in the dataset 402 are correctly tagged; that is, until every image tag is predicted correctly. In one implementation, after the completion of iterative automatic tagging 416, new untagged images 406 may be added to the dataset 402. In this way, sample selection 408 may create new samples to be sent to the manual tagging game 410 for additional rounds of manual tagging.

Figure 5:
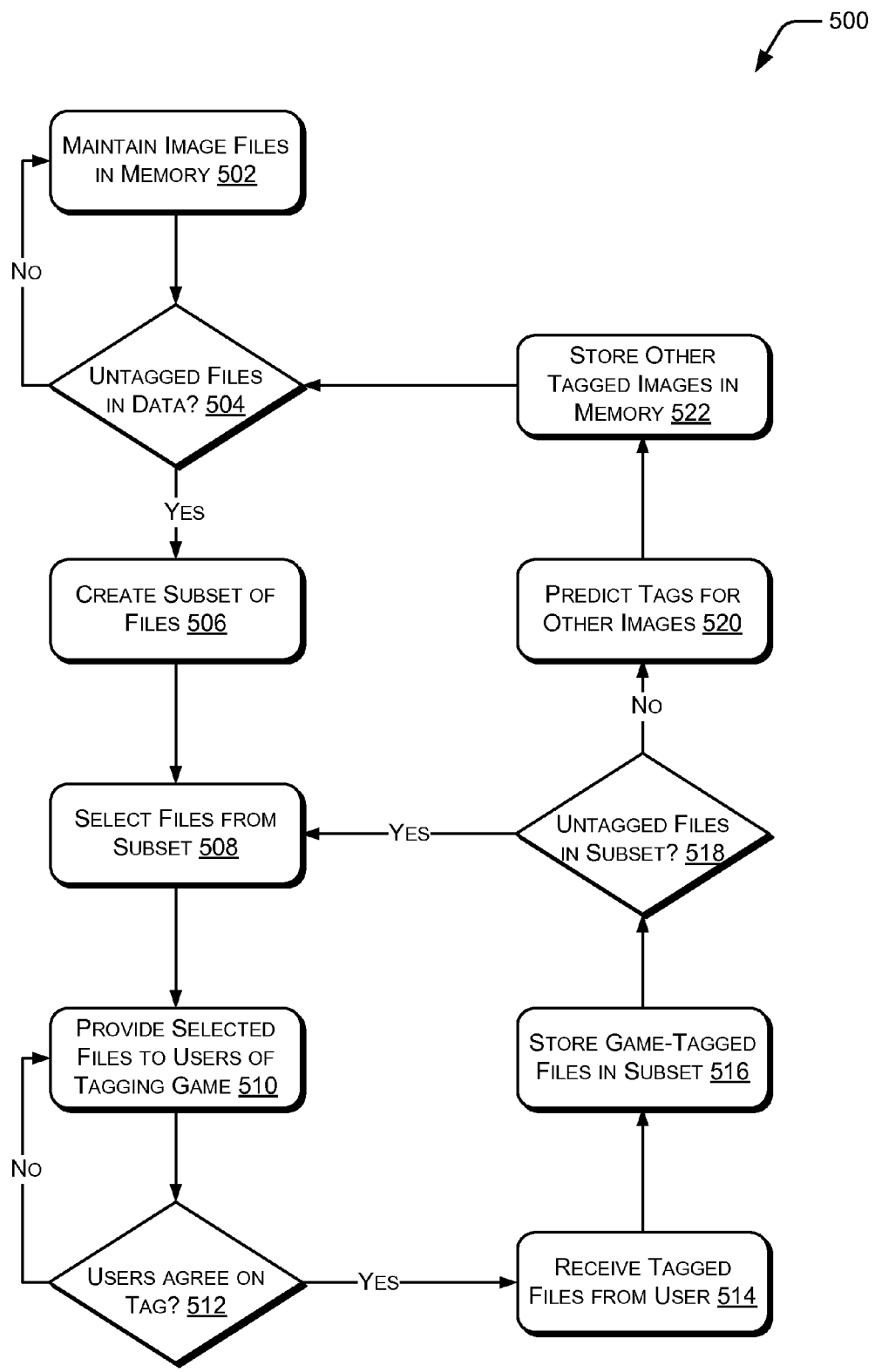
FIG. 5 is a flowchart illustrating details of the active image tagging of FIG. 4.

FIG. 5 is a flow diagram of one illustrative method 500 for implementing the active image tagging with manual tagging game 400 of FIG. 4. As discussed above, active image tagging with manual tagging game 400 may be responsible for iteratively, and automatically, tagging images within a dataset based on game-provided tags. In this particular implementation, the method 500 may begin at block 502 in which the method 500 may maintain image files in a memory. For example, as seen in FIG. 4, the image files may be stored in a dataset 402. At decision block 504, the method 500 determines whether any untagged images exist in the dataset 402. If no untagged images exist in the dataset 402, meaning that all images may have been tagged, method 500 may continue to maintain the image files in memory at block 502. Alternatively, decision block 504 may determine whether all tagged files in the dataset 402 are correctly tagged. If so, method 500 may continue to maintain the image files similar to when all the images are tagged.

On the other hand, if the method 500 determines that untagged files exist in the dataset 402, or some image files are incorrectly tagged, the method 500 may create a subset of image files at block 506 prior to selecting files at block 508. In one implementation, however, the method 500 may omit the subset creation of block 506 and proceed directly to selecting files at block 508.

By way of example, and not limitation, the method 500 may then provide the selected files to users of a tagging game at block 510. The users may perform ontology-free tagging, or even image labeling, to annotate the image files. This step may be performed independent of the method 500, or the method 500 may effectuate the manual tagging implementation by displaying the image on a display with a text field for the users and receiving the annotations directly. By way of example only, and as discussed above with reference to FIG. 4, the image tagging game may store tags for images based on matched tags of the game players. Thus, by way of example only, the method 500 may determine whether the game users agree on a tag for a given image at decision block 512. In one example, if the users do not agree on a tag for a given image, the method 500 may provide another image from the sample selection at block 510. In this way, the method 500 may iteratively present images to the game players until they agree on a tag.

On the other hand, if the users agree on a tag for a given image the method 500 may receive the tagged files from the users, and/or the game, at block 514 and then store the game-tagged image files in the subset at block 516. In one implementation, however, no subset is created and the user-tagged image files may then be stored in the dataset 402 rather than in the subset. When a subset is used, at decision block 518, the method 500 determines whether untagged images exist in the subset. If untagged images exist in the subset, meaning all images in the subset have yet to be manually tagged, the method 500 may proceed to select additional files from the subset at block 508. Thus, the method 500 may proceed iteratively until all images in the subset are manually tagged by the game.

On the other hand, if no untagged images exist in the subset, meaning all images in the subset have been manually tagged by the game, the method 500 may predict tags for the other images in the dataset 402 at block 520. In this way, the method 500 may perform the automatic tagging 416 of FIG. 4. At block 522, the method 500 stores the newly tagged images in the memory. For example, the other tagged images may be stored in the dataset 402 of FIG. 4. By way of example only, following block 522, the method 500 may continue to determine whether untagged files exist in the dataset 402 at decision block 504 once again. In this way, the active image tagging method with manual tagging game 500 may be iteratively performed until all images in the dataset 402 are tagged.

FIGS. 3-5 provide simplified examples of suitable systems and methods for active image tagging with a manual tagging game according to the present disclosure. However, other configurations are also possible. For example, while the manual tagging game 410 is shown with two users 412(1) and 412(2), this may be performed by multiple users 412(1)-(N) playing the same, or different versions, of the manual tagging game 410. Additionally, image file(s) 414(1)-(N) may each comprise multiple tags.

Illustrative methods and systems of active image tagging are described above. Some or all of these systems and methods may, but need not, be implemented at least partially by an architecture such as that shown in FIG. 3. Also, certain acts in the methods need not be performed in the order described, may be rearranged, modified, and/or may be omitted entirely, depending on the circumstances. Also, any of the acts described above with respect to any method may be implemented by a processor or other computing device based on instructions stored on one or more computer-readable storage media. Further, as used herein, computer-readable storage media does not include and should not be construed to cover carrier waves or other types of communication media.

Conclusion

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A computer-implemented method for active tagging, comprising:
    performed by one or more processors executing computer-readable instructions:
        selecting a file from a data set stored in a memory based at least in part on an informativeness measure of the file, wherein the informativeness measure is based at least in part on at least one of a citation measure, an ambiguity measure, or a diversity measure;
        providing the file to a client device for manual tagging by a user of the client device;
        receiving a manually tagged file from the user of the client device;
        storing the manually tagged file in the data set;
        predicting a tag for another file based at least in part on the manually tagged file to create another tagged file in the data set that is distinct from the manually tagged file in the data set; and
        storing the other tagged file in the data set.

2. The computer-implemented method of claim 1, wherein the manually tagged file and the other tagged file comprise image files.

3. The computer-implemented method of claim 1, wherein selecting a file from the data set comprises selecting the file from a subset of data in the data set.

4. The computer-implemented method of claim 1, further comprising iteratively performing the method until no untagged files exist in the data set.

5. The computer-implemented method of claim 3, further comprising iteratively performing the selecting the file, the providing the file, the receiving the manually tagged file from the user, and the storing the manually tagged file until no untagged files exist in the subset of data.

6. The computer-implemented method of claim 5, further comprising iteratively performing the predicting the tag for another file and the storing the other tagged file until no untagged files exist in the data set, subsequent to iteratively performing the selecting the file, the providing the file, the receiving the manually tagged file, and the storing the manually tagged file until no untagged files exist in the subset of data.

7. The computer-implemented method of claim 3, wherein the selecting a file from the data set comprises selecting the file from the subset of data based at least in part on the informativeness measure of the file.

8. The computer-implemented method of claim 1, wherein the citation measure defines a number of files neighboring the file, the ambiguity measure defines a similarity between a tag of each neighboring file and a tag of the file, and the diversity measure defines a difference between a tag of each file in a sample and the tag of the file.

9. The computer-implemented method of claim 1, wherein providing the file to a client device for manual tagging by the user comprises providing the file and a text entry field associated with the file to the client device for displaying to the user.

10. The computer-implemented method of claim 1, wherein providing the file to a client device for manual tagging by the user comprises transmitting the file through a network interface to the client device connected to a network.

11. One or more computer-readable storage media, storing processor-executable instructions that, when executed on a processor, perform acts for active tagging, the acts comprising:
    hosting a file tagging game;
    selecting a file stored in a memory, wherein the selecting comprises analyzing one or more tags to determine an appearance probability related to the selected file;
    providing the selected file to at least a first client device and a second client device of the file tagging game;
    receiving a game-defined tag associated with the selected file from at least the first client device and the second client device executing the file tagging game;
    in response to determining that the game-defined tag received from the first client device matches a game-defined tag received from the second client device, storing the game-defined tag with the selected file in the memory;

predicting a tag for another file in the memory based at least in part on the selected file and the game-defined tag stored in the memory;

associating the tag with the other file to create another tagged file; and storing the other tagged file in the memory.

12. The one or more computer-readable storage media of claim 11, wherein the file and the other file comprise image files.

13. The one or more computer-readable storage media of claim 11, wherein the performed acts further comprise iteratively performing the method until no untagged files exist in the memory.

14. A system for iterative active image tagging comprising:
memory and a processor;
an image file selection module, stored in the memory and executable on the processor, that selects an image file from a subset of data stored in the memory based at least in part on an informativeness measure comprising at least one of a citation measure defining a number of neighboring image files to the image file, an ambiguity measure defining a similarity between a tag of the image file and tags of one or more of the neighboring image files, and a diversity measure defining a difference between a tag of each image file in a sample and the tag of the image file;
a manual image file tagging module, stored in the memory and executable on the processor, that provides the selected image file to a plurality of client devices for a plurality of users to manually tag, wherein a manually tagged image file is stored in the memory in response to determining that the plurality of users select a same tag for the selected image file;
an automatic image file tagging module, stored in the memory and executable on the processor, that provides automatic image tags to other image files in the subset of data stored in the memory based at least in part on the manually tagged image file; and an iteration module, stored in the memory and executable on the processor, that iteratively activates the manual image file tagging module and the automatic image file tagging module until tagging is complete.

15. The system of claim 14, wherein the manual image file tagging module also provides the selected image file to another client device for a user of the other client device to create the manually tagged image file to be stored in the memory, the client device and the other client device being connected through a tagging game and the creation of the manually tagged image file being based at least in part on a result of the tagging game.

16. The system of claim 14, wherein the image file selection module also selects the image file based at least in part on an informativeness measure of the file.

17. The computer-implemented method of claim 11, wherein providing the selected file to the at least first client device and the second client device further comprises providing the selected file and a text entry field associated with the selected file to the at least first client device and the second client device for display.

18. The computer-implemented method of claim 11, wherein providing the selected file to the at least first client device and the second client device further comprises transmitting the file through a network interface to the at least first client device and second client device connected to a network.

19. The computer-implemented method of claim 11, wherein the selecting a file stored in a memory, further comprises selecting the file from a subset of data in a data set.

20. The computer-implemented method of claim 19, further comprising iteratively performing the selecting the file stored in the memory until no untagged files exist in the subset of data in the data set.

\* \* \* \* \*